(12) United States Patent
Jackson

(10) Patent No.: US 6,612,778 B1
(45) Date of Patent: Sep. 2, 2003

(54) SYSTEM AND METHOD FOR PREVENTING BLUFF EROSION

(75) Inventor: Gary A. Jackson, Cedarburg, WI (US)

(73) Assignee: Edward E. Gillen Co., Milwaukee, WI (US)

(*) Notice: Subject to any disclaimer, the term of this patent is extended or adjusted under 35 U.S.C. 154(b) by 0 days.

(21) Appl. No.: 10/136,078

(22) Filed: May 1, 2002

(51) Int. Cl.7 .................. E02B 11/00; E02B 13/00
(52) U.S. Cl. ..................... 405/49; 405/40; 405/43; 405/36
(58) Field of Search ................ 405/15, 17, 32, 405/272, 302.4, 302.6, 50, 43, 49

(56) References Cited

U.S. PATENT DOCUMENTS

| | | | |
|---|---|---|---|
| 599,719 A | 3/1898 | Manning | |
| 1,151,608 A | * 8/1915 | Paech | 405/50 |
| 1,344,656 A | 6/1920 | Saltsman | |
| 1,866,826 A | * 7/1932 | Strothmann | 405/45 |
| 2,136,151 A | * 11/1938 | Parrish | 405/49 |
| 2,514,509 A | * 7/1950 | Oneal | 405/45 |
| 3,625,010 A | * 12/1971 | Hakundy | 405/38 |
| 3,902,322 A | * 9/1975 | Watanabe | 405/43 |
| 4,610,568 A | * 9/1986 | Koerner | 405/19 |
| 4,655,637 A | 4/1987 | Vignocchi | |
| 4,666,334 A | 5/1987 | Karaus | |
| 4,714,376 A | 12/1987 | Jenab | |
| 4,768,897 A | 9/1988 | Nussbaumer et al. | |
| 4,820,080 A | * 4/1989 | Varkonyi et al. | 405/45 |
| 4,863,312 A | 9/1989 | Cavalli | |
| 5,015,122 A | 5/1991 | Combes | |
| 5,067,854 A | * 11/1991 | Sweeney | 405/184 |
| 5,272,910 A | * 12/1993 | Everett et al. | 73/40 |
| 5,439,326 A | * 8/1995 | Goughnour et al. | 405/303 |
| 5,597,045 A | 1/1997 | Sass et al. | |
| 5,780,144 A | 7/1998 | Bradley | |
| 5,820,296 A | 10/1998 | Goughnour | |
| 6,089,788 A | * 7/2000 | Sandanasamy | 405/50 |
| 6,161,776 A | 12/2000 | Byles | |
| 6,280,117 B1 | 8/2001 | Obermeyer et al. | |
| 6,312,190 B1 | * 11/2001 | Goughnour | 405/36 |

OTHER PUBLICATIONS

American Wick Drain Company., Product Listing Page of AWD Prefabricated Drains, with definitions, from www.americanwick.com/products.html, 4 pages, undated.*

* cited by examiner

Primary Examiner—Robert J. Sandy
Assistant Examiner—Katherine Mitchell
(74) Attorney, Agent, or Firm—Andrus, Sceales, Starke & Sawall, LLP

(57) ABSTRACT

A system is provided for preventing erosion of a bluff or hillside having a face extending between a toe at a bottom thereof and a crest at a top surface thereof, and a failure shear plane. The bluff or hillside is subject to excess water accumulation contributing to land mass degradation. The invention is improved by at least one horizontal wick drain positioned behind the failure shear plane in a water saturated zone substantially parallel to the crest of the bluff or hillside for the purpose of controlling drainage of the excess water accumulation. The horizontal wick drain is installed from the top surface of the bluff or hillside so as not to impair the structural integrity and cause land mass degradation of the face thereof.

10 Claims, 4 Drawing Sheets

US 6,612,778 B1

SYSTEM AND METHOD FOR PREVENTING BLUFF EROSION

FIELD OF THE INVENTION

This invention relates generally to erosion control of bluffs, hillsides and the like and, more particularly, pertains to a system and method for stabilizing the bluff or hillside by controlling the internal water drainage so as to prevent landslides or similar land mass slumping along the face or slope of the bluff or hillside.

BACKGROUND OF THE INVENTION

The erosion of bluffs lying adjacent a lake or ocean has constituted a long and serious environmental problem. These bluffs are subject to the action of the waves occasionally pounding against them which erode away the base of the bluff leaving the bluff with an extremely steep face. This steep front face is very unstable, and, in some instances, is not able to support the weight of the dirt, sand and the like lying above it. Consequently, landslides or slumping may occur which can endanger man-made structures as well as trees and bushes on top of the bluff.

These bluffs as well as hillsides, such as those which slope down to a highway, are also subject, on a larger scale, to the action of forces acting within as caused by groundwater and water from spray, rain or snow melt which matriculates to various layers running through and exiting out the face of the bluffs or hillsides. If water saturation becomes excessively high, the outwardly exerting forces cause collapse of the steep face of the bluff or hillside, sometimes along an appreciable length thereof.

One prior art attempt to mitigate degradation of a hillside is disclosed in U.S. Pat. No. 4,714,376 issued Dec. 22, 1987 to Jenab. In this patent, a perforated drain pipe is placed within a hillside substantially parallel to the face of the hillside at a location on or above an impermeable layer. Jenab is thus primarily concerned with control of water drainage at the bottom of the hillside and is limited to boring holes, construction of a concrete apron and placement of a drain pipe at locations close to the face of the hillside near its bottom edge where a bulldozer is used to facilitate installation. While the '376 patent discloses the use of another drain pipe at a higher level of the hillside, it is only possible that the location of such pipe is within the reaching limits of the bulldozer leading one to believe it must be near the bottom of the hillside. Installation of Jenab's drain pipes through the front face of the hillside would thus appear to contribute to the collapse of the front face of the hillside, the very problem which the present invention seeks to prevent.

Another attempt to rectify bluff erosion by controlling internal water drainage has resulted in installing horizontal wick drains through the face of the bluff at angles generally perpendicular thereto. These installations are effected by forming a series of bores in upper elevations of the bluff using drilling equipment mounted on a support device suspended outside the face of the bluff. While such installations have been generally satisfactory for their intended purpose, they have not proven to be as efficient as desired in regulating bluff drainage. They also can exacerbate the problem because they conduct water and turn many drilled holes perpendicular to the bluff which adds water to the mass between the bluff shear plane and the bluff face.

Accordingly, it is desirable to provide a differently styled system and method for preventing bluff or hillside erosion which is more efficient in stabilizing the face of the bluff or hillside by controlling the water seepage therein.

SUMMARY OF THE INVENTION

It is a general object of the present invention to provide a novel and improved system which alters the natural drainage of water from the bluff so as to substantially preserve the formation thereof.

It is also an object of the present invention to strategically position a horizontal wick drain parallel to the crest or toe of the bluff in a water saturated layer or layers running therethrough.

It is a further object of the present invention to provide a unique method of installing a horizontal wick drain in a bluff using conventional drilling equipment.

It is an additional object of the present invention to provide for channeling water down the face of the bluff to a beach level using collection pipes attached to wick drain end points.

It is another object of the present invention to provide a bluff erosion protection system which eliminates the need for insertion of drainage structure by drilling or excavating the face of the bluff or hillside.

A still further object of the present invention is to provide a dewatering system for a bluff which does not require supplemental physical structure at the base or along the slope of the bluff.

In one aspect of the invention, a system is provided for preventing erosion of a bluff or hillside having a face extending between a toe at a bottom thereof and a crest at a top surface thereof, and a failure shear plane. The bluff or hillside is subject to excess water accumulation contributing to land mass degradation thereof. The system is improved by at least one horizontal wick drain positioned behind the failure shear plane in a water saturated zone substantially parallel to the crest of the bluff or hillside for the purpose of controlling drainage of the excess water accumulation. The horizontal wick drain is installed from the top surface of the bluff or hillside so as not to impair the structural integrity or cause land mass degradation of the face thereof. The wick drain has a proximal end located at the top surface of the bluff or hillside, and a distal end located in the water saturated zone at the face of the bluff or hillside. The distal end of the wick drain curves to exit at the bluff face and is connected to a solid drain pipe which extends downwardly along the face of the bluff or hillside and terminates in advance of the toe of the bluff or hillside. The wick drain is installed in a hole formed by a horizontal directional boring machine positioned on the top surface of the bluff or hillside.

In another aspect of the invention, in a bluff lying adjacent a body of water and having a shear failure plane and a face extending from a toe at the bottom of the bluff to a crest at the top surface of the bluff, there is provided a drainage system for preventing erosion of the bluff caused by excess water forces acting outwardly towards the face of the bluff. The system includes an elongated bore extending substantially parallel to the crest of the bluff behind the shear failure plane and having a first end at the top surface of the bluff, and a second end exiting through the face of the bluff, the bore being formed from the top surface of the bluff. An elongated horizontal wick drain has a plastic corrugated core surrounded by a filtering fabric and is positioned within the bore, the wick drain further having a proximal end at the first end of the bore and a distal end at the second end of the bore. A collector drain pipe is connected to the distal end of the wick drain for returning excess water accumulated to the wick drain in the adjacent body of water. The bluff includes a water attracting sand layer interposed between a pair of clay layers. The bore and the wick drain are located substantially in the sand layer.

The invention further contemplates a method for preventing erosion in a face of a bluff having accumulated water therein, the face running from a toe of the bluff to a crest of the bluff at a top surface thereof. The method includes the steps of drilling a series of substantially vertical holes into the top surface of the bluff to locate a shear failure plane and water bearing layers in the bluff; advancing a drill string from an out hole at a top surface of the bluff downwardly on a radius, horizontally in a water saturated zone behind the shear failure plane and then outwardly to the face of the bluff; connecting an end of the drill string at the face of the bluff to a proximal end of a horizontal wick drain for channeling water accumulated in the bluff; withdrawing the drill string from the out hole at the top surface of the bluff so as to drag the wick drain through the out hole bringing the proximal end of the wick drain to the top surface of the bluff and a distal end of the wick drain to the face of the bluff; disconnecting the wick drain from the drill string when the proximal end reaches the top surface of the bluff; and attaching an input end of a collection drain pipe to the distal end of the wick drain for directing water accumulated in the wick drain via an outlet end away from the face of the bluff.

The step of advancing the drill string in the horizontal hole is performed using a horizontal directional boring machine located at the top surface of the bluff. The steps of connecting an end of the drill string to the proximal end of a horizontal wick drain, and the step of attaching the collector drain pipe to the distal end of the wick drain are performed by a worker suspended in a cherry picker positioned on the top surface of the bluff. All of the steps avoid excavation and drilling of the face of the bluff.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
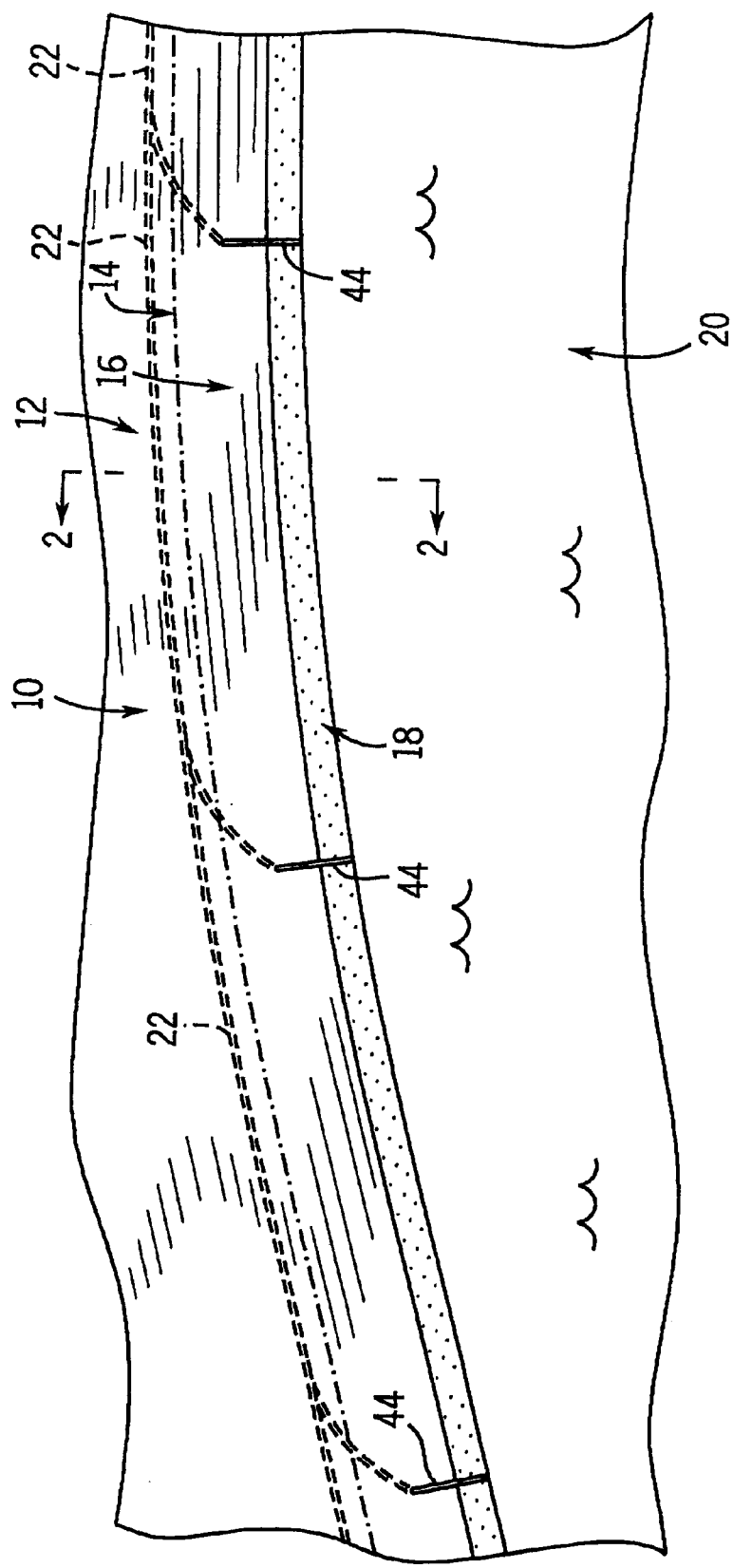
FIG. 1 is a fragmentary, plan view of a bluff equipped with a wick drain extending parallel thereto in accordance with the invention.

Referring to the drawings, FIG. 1 illustrates a dewatering or drainage system in accordance with the present invention which is installed in a bluff 12 having a crest 14 and a slope 16 extending from the crest downwardly to a beach 18 located adjacent a body of water, such as a lake 20. As discussed previously herein, the system 10 is intended to safeguard the land mass and profile of the bluff 12 by controlling the internal water seepage so as to prevent erosion thereof. At the outset, it should be appreciated that the invention contemplates the provision of at least one wick drain installed internally in the bluff in a manner to be described. In the preferred embodiment, three identical horizontal wick drains 22, each having a typical length of 600 to 1,000 feet, are installed along a length of bluff 12 approximating 3,000 feet long.

Figure 2:
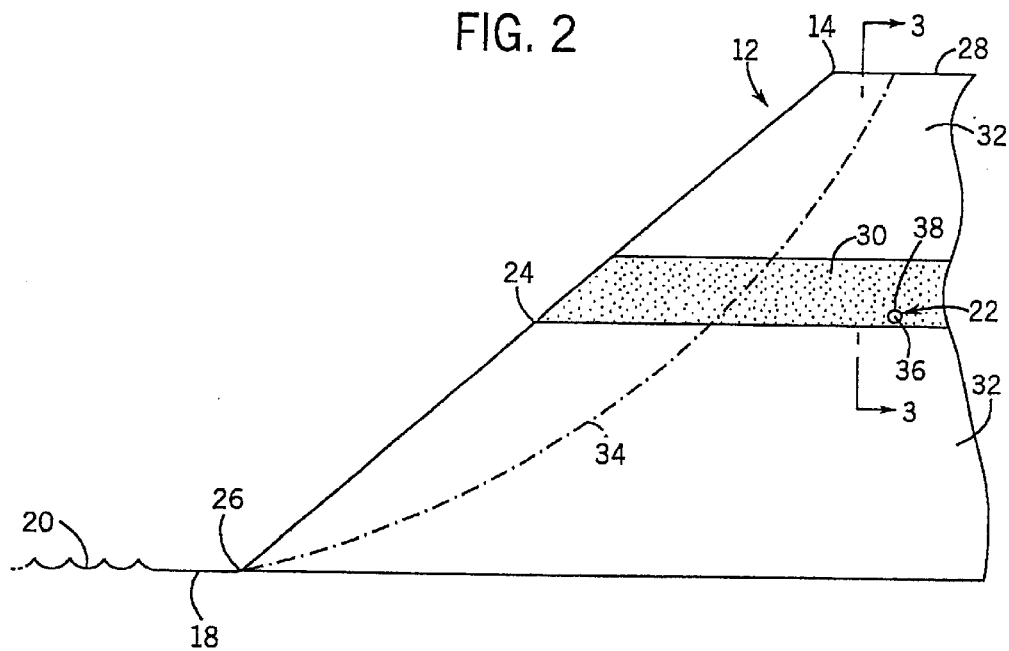
FIG. 2 is an enlarged, sectional view taken on line 2—2 of FIG. 1.
Figure 3:
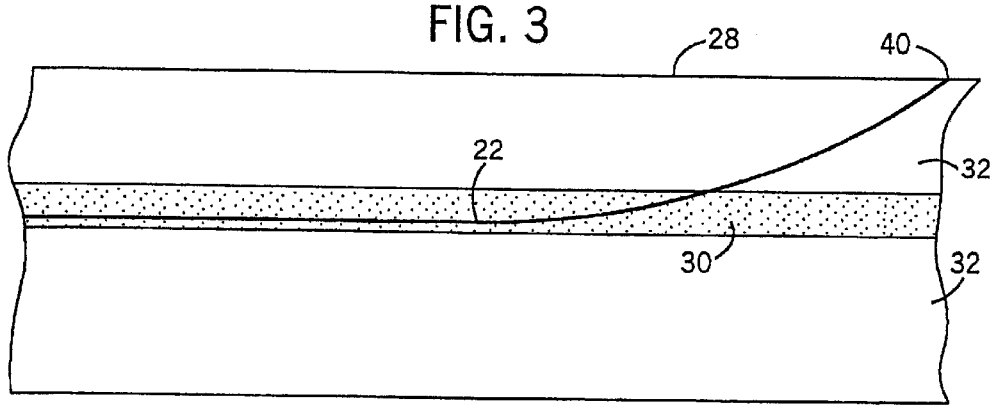
FIG. 3 is a sectional view taken on line 3—3 of FIG. 2.

Referring now to FIGS. 2 and 3, the invention is particularly suitable for bluffs 12 having slopes of at least 45 degrees from the horizontal. Bluff 12 includes a face 24 which extends upwardly and inwardly from a toe or foot 26 to the crest 14. The crest 14 defines the forwardmost limit of a generally horizontal top surface 28 of the bluff 12 which runs substantially parallel to the beach 18 at the lake level. The bluff 12 typically includes a water bearing layer 30 (in this case, a sand layer) which is interposed between two layers 32 of clay. In an exemplary bluff 12 having a height of 80 feet, the water bearing sand layer 30 is typically formed between the 40 foot and 50 foot levels. While the water bearing layer 30 is shown as being horizontal, it should be noted that the layer 30 may undulate in various paths throughout the bluff 12. Water accumulated in the bluff 12 tends to flow freely outwardly through the sand layer 30 towards the face 24 of the bluff 12. If unchecked, this drainage will, over time, erode the face 24 of the bluff 12 until the bluff failure shear plane 34 is reached, at which point severe erosion in the form of a land slide occurs.

Figure 7:
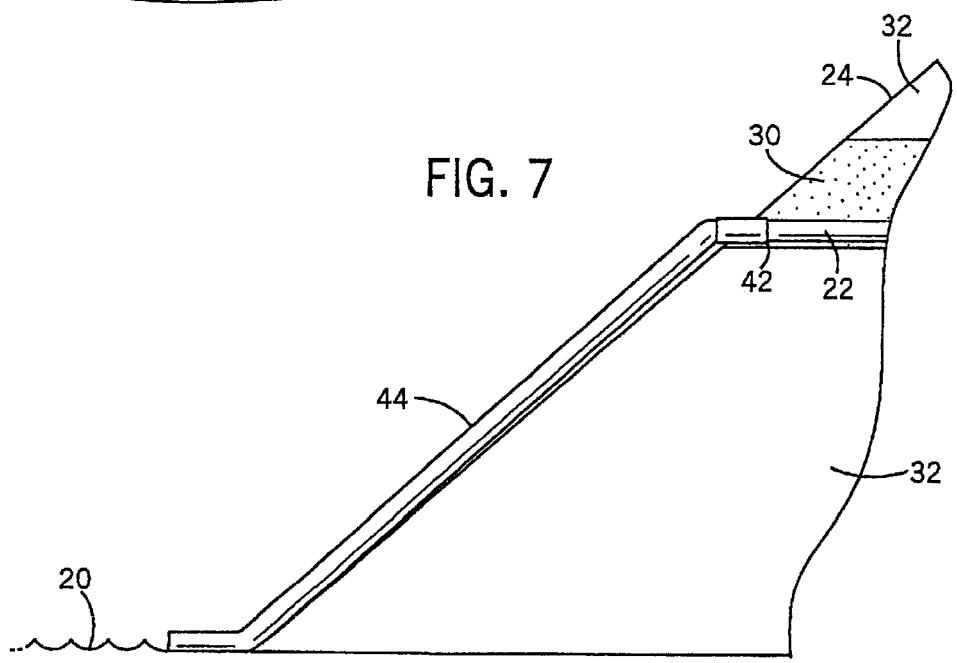
FIG. 7 is a fragmentary view of a drain pipe running down the slope of a bluff for directing excess water in the bluff collected in the wick drain.

In accordance with the invention, each horizontal wick drain 22 is located in the water bearing layer 30 substantially parallel to the toe 26 or crest 14 of the bluff 12 without drilling or excavating the face 24 thereof. The wick drain 22, as shown in FIG. 2, is fabricated of at least one and occasionally several corrugated plastic rolls or cores 36 which are surrounded longitudinally by a geotextile, meshed fabric sleeve 38 that allows easy water entry while preventing entry of soil particles. Drain clogging can be prevented if the fabric sleeve 38 is properly matched to the soil type. The corrugated cores 36 are cheaply produced by extrusion of acceptable plastic materials such as polyethylene. The geotextile fabric sleeve 38 may be manufactured of, for example, a non-woven polypropylene filter material. Because there are no obstructions to the flow of water in the channels of the corrugated core 36, flow capacity is very high. FIG. 3 shows the manner in which each wick drain 22 extends from a proximal end 40 at the top surface 28 of the bluff 12 downwardly and then horizontally in the layer 30 substantially parallel to the crest 14 of the bluff 12. It should be appreciated that water flow in the sand layer 30 is generally normal to the positioning of the wick drain 22, so that water collection is extremely efficient. Each wick drain 22 curves outwardly towards the face 24 of the bluff 12 (FIG. 1), and terminates in a distal end portion 42 (FIG. 7). The distal end portion 42 is connected to a solid drain pipe 44 and transports wick collected water down the face 24 of the bluff over the beach 18 and into the lake 20.

A further important aspect of the present invention resides in the method in which the wick drain system is installed. In contrast with prior art drainage systems, installation of the wick drains 22 is accomplished from the top rather than from the face of the bluff 12.

Figure 4:
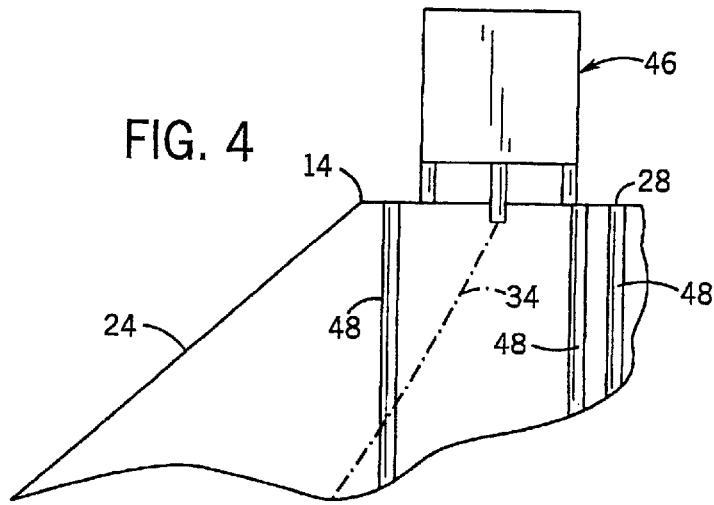
FIG. 4 is a fragmentary representation of a vertical drilling machine used to take soil samples to establish the failure shear plane and to locate water bearing layers for the wick drain.

With reference to FIG. 4, the first step of the wick drain installation procedure relates to the locating of the bluff shear failure plane 34. A conventional mobile vertical drilling machine 46 is positioned on the top surface 28 of the bluff 12 near the crest 14. Upon drilling of several holes 48-, a geological engineer drills vertical sampling holes 48 to the beach level 18 to construct a soil profile and shear plane 34 and to locate the water level and water bearing seams. It is critical that the placement of any drainage system is located behind (that is, in the direction away from) the shear failure plane 34 so as to avoid causing a landslide.

Figure 5:
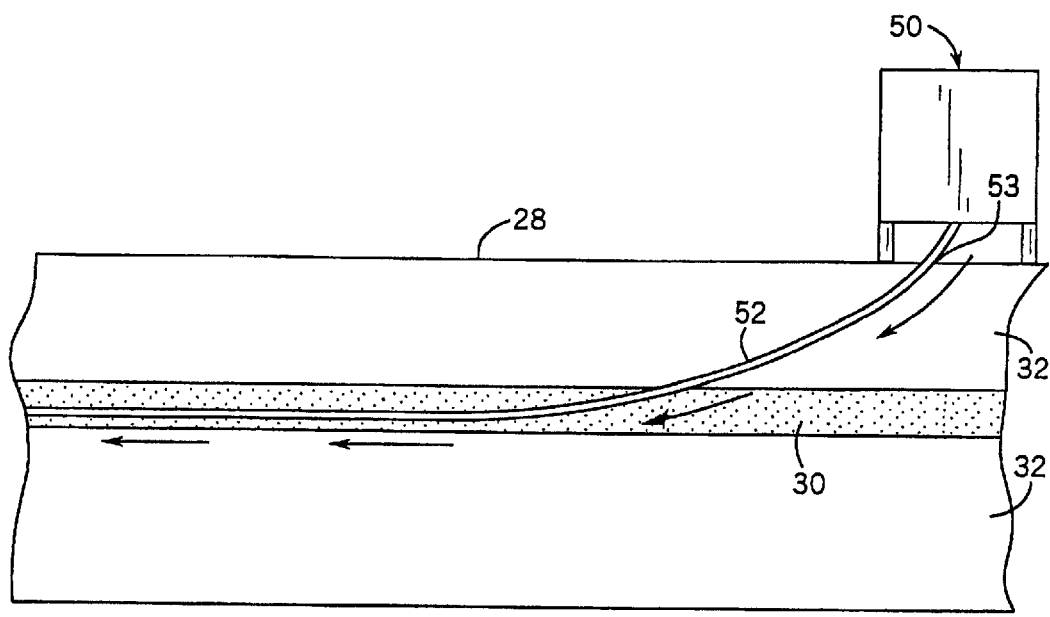
FIG. 5 is a fragmentary representation of a horizontal boring machine used to insert a drill string for drilling a wick receiving hole in a water bearing layer of the bluff.
Figure 6:
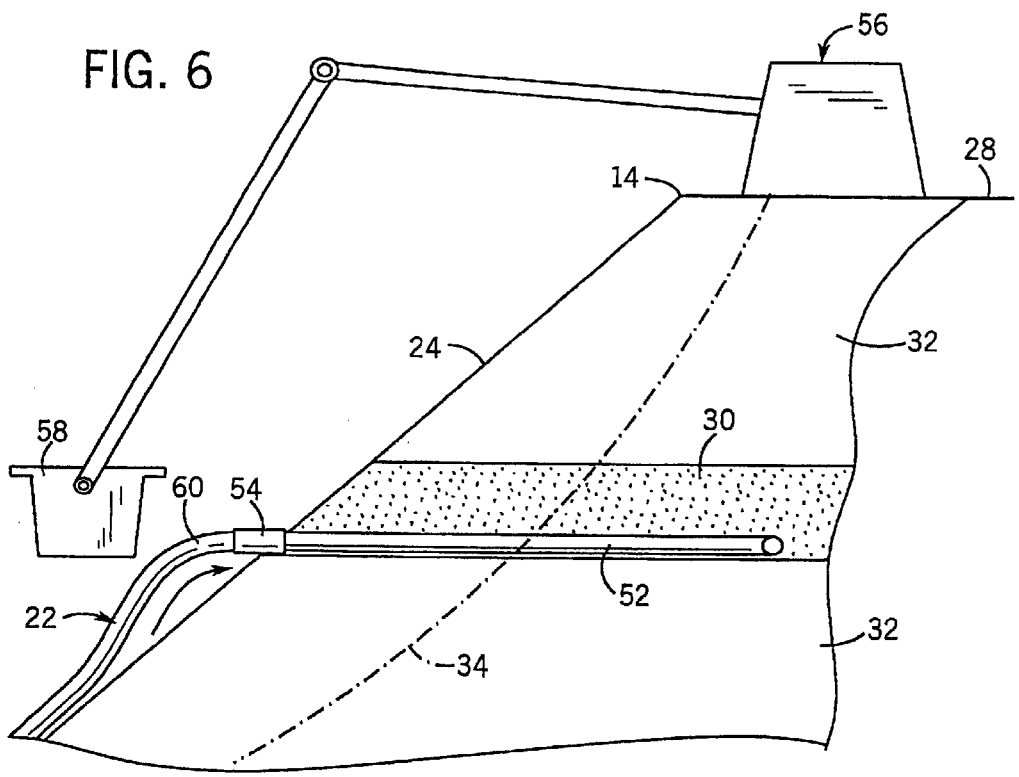
FIG. 6 is a fragmentary representation of a cherry picker used to facilitate attachment of one end of a wick drain to the end of the horizontal boring machine drill string.

Once the shear failure plane 34 is identified, a conventional mobile horizontal directional boring (HDB) machine 50 (FIG. 5) is positioned on the top surface 28 of the bluff 12 for the purpose of drilling a substantially horizontal hole (typically four inches in diameter) for a length of about 600 to 1,000 feet substantially parallel to the crest 14 or toe 26 of the bluff 12. As is known, the HDB machine 50 has a drill string 52 with an end portion 54 (FIG. 6) that is traceable by a worker positioned on the top surface 28 of the bluff 12 and spaced in front of the machine 50 with an electronic tracking device so as to direct its path in the bluff 12. In the preferred embodiment, the drill string 52 progresses from an out hole 53 formed in the top of the bluff 12 downwardly on a radius towards and then moves substantially horizontally in the sand layer 30 which happens to be an easily locatable water saturated layer in the bluff 12. In FIG. 5, the drill string 52 traverses along a linear path, but it should be understood that the drill string 52 might undulate up and down or back and forth depending on the nature and location of the strata holding an abundance of water within the bluff 12. In any case, the path of the drill string 52 is generally parallel to the crest 14 of the bluff 12 at a location behind the shear failure plane 34. As the drill string 52 advances, a polymer slurry is deposited inside the formed hole for enabling a friction reduced removal of the drill string 52. After traveling its preferred length, the end 54 of the drill string 52 curves outwardly in the sand layer 30 to the face 24 of the bluff 12 (FIG. 6) where drilling is terminated.

At this point, a "cherry picker" 56 or similar apparatus is placed on the top surface 28 of the bluff 12 near the crest 14. The cherry picker 56 has a moveable basket 58 in which a worker positioned therein may attach a proximal end 60 of the 600 to 1,000 foot long wick drain 22 to the end of the drill string 52. Once connection has been made, the drill string 52 is retracted in the formed hole, pulling the wick drain 22 along with it until the proximal end 60 reaches the out hole 53 in the top surface 28 of the bluff 12 at which point the drill string 52 is disconnected from the wick drain 22. As mentioned above, retraction of the drill string 52 is facilitated by the low friction polymer slurry inside the hole. The opposite end of the wick drain 22 may be cut or otherwise manipulated or monitored by the worker in the cherry picker 54 to establish the distal end 42 of the drain as shown in FIG. 7.

With the wick drain 22 in place within the bored hole, a worker in the cherry picker 56 can attach the solid collector drain pipe 44 to the distal end 42 of the wick drain 22. The collector drain pipe 44 extends downwardly along the face 24 of the bluff 12 and then outwardly over the beach 18 to deposit water accumulated in the wick drain 22 into the lake 20.

It should be understood that once in use, the polymer slurry lining the hole holding the wick drain 22 will simply be filtered by the fabric sleeve 38 and then be flushed away by accumulating water seeping into the bore formed by the drill string 52.

While the system and method described above are particularly beneficial for control of water drainage in a lakeside or oceanside bluff 12, it should be appreciated that the present invention has a wider range of application for other sloped land masses. For example, a hillside sloping down to a highway also requires soil stabilization to prevent landslides which can impair traffic flow and cause danger to those traveling in vehicles on the highway. Using the equipment and procedures previously discussed, with collector drain pipes 44 leading to various types of drain structure provided alongside the highway, soil erosion can be effectively managed.

The present invention thus provides for a bluff or hillside erosion prevention system which is able to accumulate much larger soil quantities of drainage water than the prior art by placing horizontal wick drains 22 substantially parallel to the crest 14 of the hillside or bluff 12 in water saturated zones 30 located behind the shear failure plane 34. It is extremely noteworthy that the positioning and location of such horizontal wick drains 22 are accomplished from the top 28 of the bluff or hillside 12; that is, there is no drilling or excavating of the bluff or hillside 12 from the face 24 thereof. Not only is this important so as to avoid causing early landslides, but also physical installation is made less dangerous and more universally possible. For example, in a bluff application, it may be physically impossible to locate excavating and/or drilling equipment on a beach 18 having a low elevation and reduced width or unstable composition. For wick drains installed from the face of the hillside, it is unsafe to have working equipment penetrating the slope 16 of the hillside 12 with ongoing traffic flow in close vicinity.

While the invention has been described with reference to a preferred embodiment, those skilled in the art will appreciate that certain substitutions, alterations and omissions may be made without departing from the spirit thereof. Accordingly, the foregoing description is meant to be exemplary only, and it should not be deemed limitative on the scope of the invention as set forth in the following claims.

I claim:

1. In a system for preventing erosion of a bluff or hillside having a face extending between a toe at a bottom thereof and a crest at a top surface thereof, and a failure shear plane, the bluff or hillside being subject to excess water accumulation contributing to land mass degradation thereof, the improvement comprising:

at least one horizontal wicking drain positioned behind the failure shear plane in a water saturated zone substantially parallel to the crest of the bluff or hillside for the purpose of controlling drainage of the excess water accumulation, the horizontal wicking drain having a proximal end located at the crest of the bluff or hillside, and a distal end located in the water saturated zone at the face of the bluff or hillside so as not to impair the structural integrity and cause land mass degradation of the face thereof.

2. The improvement of claim 1, wherein the distal end of the wicking drain curves to exit at the bluff face and is connected to a solid drain pipe which extends downwardly along the face of the bluff or hillside and terminates in advance of the toe of the bluff or hillside.

3. The improvement of claim 1, wherein the wicking drain is positioned in a hole formed by a horizontal directional boring machine positioned on the top surface of the bluff or hillside.

4. In a bluff lying adjacent a body of water and having a shear failure plane and a face extending from a toe at the bottom of the bluff to a crest at a top surface of the bluff, a drainage system for preventing erosion of the bluff caused by excess water forces acting outwardly towards the face of the bluff, the system comprising:

an elongated bore extending substantially parallel to the crest of the bluff behind the shear failure plane and having a first end at the top surface of the bluff and a second end at a lower elevation exiting through the face of the bluff, the bore being started from the top surface of the bluff;

an elongated horizontal wicking drain having a plastic corrugated core surrounded by a filtering fabric, the wicking drain being positioned within the bore and further having a proximal end at the first end of the bore and a distal end at the second end of the bore; and a collector drain pipe connected to the distal end of the wicking drain for returning excess water accumulated in the wicking drain to the adjacent body of water.

5. The system of claim 4, wherein the bluff includes a water attracting sand layer interposed between a pair of clay layers.

6. The system of claim 5, wherein the bore and the wicking drain are located substantially in a water bearing layer.

7. A method for preventing erosion in a face of a bluff having accumulated water therein, the face running from a toe of the bluff to a crest of the bluff at a top surface thereof, the method comprising the steps of:

drilling a series of substantially vertical holes into the top surface of the bluff to locate a shear failure plane behind a line extending from the toe of the bluff to the top surface of the bluff; and to locate water in the bluff;

advancing a drill string from an out hole at a top surface of the bluff downwardly on a radius, horizontally in a water saturated zone and then outwardly to the face of the bluff;

connecting an end of the drill string at the face of the bluff to a proximal end of a horizontal wicking drain for channeling water accumulated in the bluff;

withdrawing the drill string from the out hole at the top of the bluff so as to drag the wicking drain through the out hole bringing the proximal end of the wicking drain to the top surface of the bluff and a distal end of the wicking drain to the face of the bluff;

disconnecting the wicking drain from the drill string when the proximal end reaches the top surface of the bluff; and attaching an input end of a collection drain pipe to the distal end of the wicking drain for directing water accumulated in the wicking drain via an outlet end away form the face of the bluff.

8. The method of claim 7, wherein the step of advancing a drill string in a horizontal hole is performed using a horizontal directional boring machine located at the top surface of the bluff.

9. The method of claim 7, wherein the step of connecting an end of the drill string to a proximal end of a horizontal wicking drain, and the step of attaching a collector drain pipe to the distal end of the wicking drain are performed by a worker suspended in a cherry picker positioned on the top surface of the bluff.

10. The method of claim 7, wherein all of steps avoid excavation and drilling of the face of the bluff.

* * * * *